(12) United States Patent
Camurdan et al.

(10) Patent No.: US 12,702,940 B2
(45) Date of Patent: Aug. 11, 2026

(54) FILTER APPARATUS WITH PIVOTABLE FILTER CARTRIDGE

(71) Applicant: Robert Bosch GmbH, Stuttgart (DE)

(72) Inventors: Hakan Camurdan, Neu-Ulm (DE); Katrin Kroener, Ballendorf (DE); Alexander Patrick Steiner, Neu-Ulm (DE)

(73) Assignee: Robert Bosch GmbH, Stuttgart (DE)

( * ) Notice: Subject to any disclaimer, the term of this patent is extended or adjusted under 35 U.S.C. 154(b) by 377 days.

(21) Appl. No.: 18/496,584

(22) Filed: Oct. 27, 2023

(65) Prior Publication Data

US 2024/0157276 A1 May 16, 2024

(30) Foreign Application Priority Data

Nov. 10, 2022 (DE) .................... 10 2022 211 921.5

(51) Int. Cl.
*B01D 29/96* (2006.01)

(52) U.S. Cl.
CPC .... *B01D 29/965* (2013.01); *B01D 2201/0415* (2013.01); *B01D 2201/16* (2013.01); *B01D 2201/282* (2013.01); *B01D 2201/29* (2013.01)

(58) Field of Classification Search
CPC .......... B01D 29/965; B01D 2201/0415; B01D 2201/29; B01D 2201/282; B01D 2201/16
See application file for complete search history.

(56) References Cited

U.S. PATENT DOCUMENTS

| | | | | |
|---|---|---|---|---|
| 7,367,258 | B2 * | 5/2008 | Wanschura | F04B 1/324 91/506 |
| 9,726,296 | B2 * | 8/2017 | Neubauer | F16K 31/406 |
| 10,213,715 | B2 * | 2/2019 | South | B01D 29/117 |
| 10,539,130 | B2 * | 1/2020 | Frick | F04B 1/324 |
| 11,638,889 | B2 * | 5/2023 | Weaver | B01D 29/21 210/435 |
| 2018/0193781 | A1 * | 7/2018 | Page | B01D 35/30 |
| 2018/0214803 | A1 * | 8/2018 | Li | B01D 35/153 |

OTHER PUBLICATIONS

Usit-Ring, Hytec Hydraulik, available at least as early as Oct. 10, 2022 (2 pages).
Rexroth, Axial Piston Variable Pump A4VG Series 32, Jun. 2018 (9 pages).

* cited by examiner

*Primary Examiner* — Youngsul Jeong
(74) *Attorney, Agent, or Firm* — Maginot, Moore & Beck LLP

(57) ABSTRACT

A filter apparatus is for use with a hydraulic machine. The filter apparatus includes a connecting part and a filter cartridge. The connecting part includes a sealing face, which is configured for sealing abutment on the hydraulic machine. An input connector and an output connector are arranged within the sealing face. The filter apparatus further includes a separate retaining part on which the filter cartridge is fixedly received. The connecting part has a pivoting appendage extending along a pivot axis on a side of the connecting part facing away from the sealing face. The retaining part is fluid-tightly adapted to the pivoting appendage such that (i) its pivoting position with respect to the pivot axis is continuously adjustable relative to the connecting part, and (ii) between the retaining part and the pivoting appendage, a first and a second pressure chamber are arranged.

13 Claims, 3 Drawing Sheets

FILTER APPARATUS WITH PIVOTABLE FILTER CARTRIDGE

This application claims priority under 35 U.S.C. § 119 to patent application no. DE 10 2022 211 921.5, filed on Nov. 10, 2022 in Germany, the disclosure of which is incorporated herein by reference in its entirety.

BACKGROUND

A hydraulic machine in the form of an axial piston machine in a swashplate design is known. From the corresponding data sheet, an attachment filter having a cold start valve is known. It is screwed onto the hydraulic machine via a flat sealing face, wherein an input connector, an output connector, and a tank connector are arranged within the sealing face. Due to the fixedly specified position of these connectors, only a single orientation of the filter cartridge of the attachment filter is possible.

SUMMARY

One advantage of the disclosure is that the orientation of the filter cartridge is continuously variable with respect to a pivot axis. The known interface to the hydraulic machine remains unchanged. The space requirement for the entire filter apparatus remains largely unchanged.

It is proposed that the filter apparatus comprises a separate retaining part on which the filter cartridge is fixedly received, wherein the connecting part has a pivoting appendage, which extends along a pivot axis on the side of the connecting part facing away from the sealing face, wherein the retaining part is fluid-tightly adapted to the pivoting appendage such that, on the one hand, its pivoting position with respect to the pivot axis is continuously adjustable relative to the connecting part, wherein, on the other hand, between the retaining part and the pivoting appendage, a first and a second pressure chamber are arranged, wherein the first fluid flow path leads from the input connector through the connecting part via the first pressure chamber through the retaining part to the filter cartridge, further through the retaining part to the second pressure chamber and further via the connecting part to the output connector.

The sealing face is preferably planar. The first fluid flow path is preferably permanently open for a fluid flow from the input connector to the output connector. It is understood that this is no longer the case for a completely clogged filter cartridge, wherein the filter cartridge is preferably changed prior to a full clog. A center axis of the filter cartridge, preferably substantially rotationally symmetrical, is preferably aligned perpendicular to the pivot axis. The retaining part preferably abuts at least one circular cylindrical abutment face on the sealing appendage with respect to the pivot axis. A separate seal, in particular a sealing ring, is preferably provided in the region of this abutment face. In addition or alternatively, a metallic seal can be provided. i.e., between the retaining part and the abutment face, a very narrow gap is provided, through which substantially no pressurized fluid can pass, even if it is under high pressure. The retaining part preferably encompasses the pivoting appendage in a cup-like manner.

The hydraulic machine is preferably an axial piston machine, which can have a swashplate design or a slanted axis design. The hydraulic machine preferably comprises a feed pump and a main pump, wherein the filter apparatus is connected between the feed pump and main pump.

The filter apparatus is preferably operated with a pressurized fluid, which is most preferably a liquid and in particular hydraulic oil.

It can be provided that the sealing face is planar, wherein the pivot axis is aligned perpendicular to the sealing face. Thus, in most pivot positions, the filter cartridge only passes a little above the hydraulic machine.

It can be provided that the first and/or the second pressure chamber revolve around the pivot axis in the form of a closed ring. The aforementioned ring is preferably respectively configured so as to be rotationally symmetrical with respect to the pivot axis. In particular, it has a substantially constant cross-sectional shape over its entire circumference. The hydraulic properties of the filter apparatus, in particular the flow resistance, are thus largely independent of the selected pivot position of the filter cartridge.

It can be provided that a tank connector is arranged within the sealing face, wherein a cold start valve is provided, wherein a second fluid flow path leads from the input connector via the cold start valve to the tank connector, wherein the cold start valve is arranged within the pivoting appendage, wherein the cold start valve is preferably configured such that the second fluid flow path is released when the difference between the pressure at the input connector and the pressure at the output connector exceeds a specified value. The arrangement of the cold start valve in the pivoting appendage results in a particularly compact filter apparatus that does not require significantly more design space compared to a filter apparatus according to the disclosure without a cold start valve. The cold start valve preferably comprises a seat valve that is connected to the second fluid flow path, wherein a movable valve body of the seat valve is formed by a control slider, wherein the associated valve seat is fixedly connected to the connecting part.

It can be provided that the cold start valve comprises a control slider, which is received within the pivoting appendage, wherein it is linearly movable in the direction of a slider axis, wherein the slider axis is oriented parallel to the pivot axis. With this orientation of the cold start valve, a particularly compact filter apparatus results, in which the control slider can also be mounted particularly easily, in particular from the tank connector.

It can be provided that a third pressure chamber is arranged between the retaining part and the pivoting appendage, which chamber is delimited in sections by a first end face of the pivoting appendage facing in the direction of the pivot axis, wherein the third pressure chamber is permanently fluidly connected to the tank connector. The third pressure chamber is used in order to discharge leakages, in particular from the second pressure chamber. The first end face is preferably planar, wherein it is aligned perpendicular to the pivot axis. The third pressure chamber preferably extends annularly around the pivot axis, wherein it is configured so as to be most preferably rotationally symmetrical with respect to the pivot axis. It preferably has a constant cross-sectional shape over its entire circumference, which is most preferably rectangular.

It can be provided that the pivoting appendage has a second end face facing in the direction of the pivot axis and being arranged offset from the first end face in the direction of the pivot axis, wherein the second end face directly abuts the retaining part, wherein a clamping means is provided, by means of which the retaining part can be clamped against the second end face. With the clamping means, the pivoting position of the retaining part relative to the connecting part can be fixedly adjusted so that the pivoting position does not change during operation. The level of the corresponding clamping force substantially has no effect on the sealing of the first and the second pressure chambers, so that the pivoting position is also adjustable in case of a hydraulic machine filled with pressurized fluid. The clamping means is preferably formed by a clamping screw, which penetrates the retaining part in the region of the second end face, wherein it is screwed into the connecting part in the region of the second end face. The clamping means is preferably arranged coaxially to the pivot axis. When viewed in the direction of the pivot axis, the first end face surrounds the second end face, preferably in the form of a closed ring, so that the third pressure chamber has the form of a closed ring. The second end face is preferably planar, wherein it is aligned perpendicular to the pivot axis.

It can be provided that the control slider is arranged flush with the tank connector in the direction of the slider axis. The control slider can thus be installed particularly easily in the connecting part from the tank connector. The slider axis is preferably arranged at a distance from the pivot axis so that all three of the aforementioned connectors can be arranged in the sealing face in a space-saving manner.

It can be provided that the control slider is penetrated by a longitudinal bore in the direction of the slider axis, so that the third pressure chamber is permanently fluidly connected to the tank connector via the longitudinal bore. The corresponding fluid connection requires little design space and can be manufactured inexpensively. The longitudinal bore is preferably arranged in a circular cylindrical manner with respect to the slider axis.

It can be provided that a separate insert is arranged between the control slider and the tank connector and forms a valve seat, which can be closed from an end face of the control slider in the sense of a seat valve, wherein the first pressure chamber can be connected to the tank connector via the aforementioned seat valve in order to selectively release or close the second fluid flow path, wherein the insert is fixedly retained in the connecting part at least in the direction of the pivot axis and radially to the slider axis. The valve seat is preferably rotationally symmetrical with respect to the slider axis, so that the rotational position of the insert in the connecting part is not important. The valve seat is configured to be circularly tapered with respect to the slider axis, for example. The hydraulically acting diameter of the valve seat is preferably configured so as to be large enough so that the control slider is pressure-balanced with respect to the pressure at the tank connector. This is easily possible due to the longitudinal bore discussed above. The first pressure chamber is preferably arranged closer to the sealing face in the direction of the pivot axis and the slider axis, respectively, than the second pressure chamber.

It can be provided that the control slider has a collar that fluid-tightly abuts a first slider bore in the connecting part, wherein the corresponding sealing engagement delineates the pressure in the first and second pressure chambers from one another such that the valve slider is effectively impinged by a difference between the pressure in the first pressure chamber and the pressure in the second pressure chamber in the direction of the slider axis. The first slider bore is preferably circularly cylindrical with respect to the slider axis. An outer diameter of the insert is preferably larger than a diameter of the first slider bore, so that the control slider can be installed in the first slider bore from the tank connector, wherein the insert is mounted thereafter. The first pressure space is preferably arranged closer to the seat valve than the second pressure space.

It can be provided that, at an end facing away from the sealing face, the control slider is dipped into a fluid-tightly adapted second slider bore, regardless of the position of the control slider, wherein a diameter of the second slider bore is less than a diameter of the first slider bore, such that an annular space results in the region of the aforementioned end of the control slider, wherein the annular space is permanently fluidly connected to the second pressure chamber. The collar is impinged by the pressure at the outlet connector via the ring space, so that the cold start valve has the desired function. The second slider bore is preferably circularly cylindrical with respect to the slider axis.

It can be provided that a spring is received in the annular space, which impinges the collar of the control slider in the closing direction of the seat valve. By means of the biasing force of the spring, the aforementioned pressure difference at which the cold start valve opens can be adjusted.

It is understood that the aforementioned features and the features yet to be explained below can be used not only in the respectively specified combination but also in other combinations or alone, without leaving the scope of the disclosure.

BRIEF DESCRIPTION OF THE DRAWINGS

The disclosure is explained in more detail below with reference to the enclosed drawings. The figures show.

DETAILED DESCRIPTION

Figure 1:
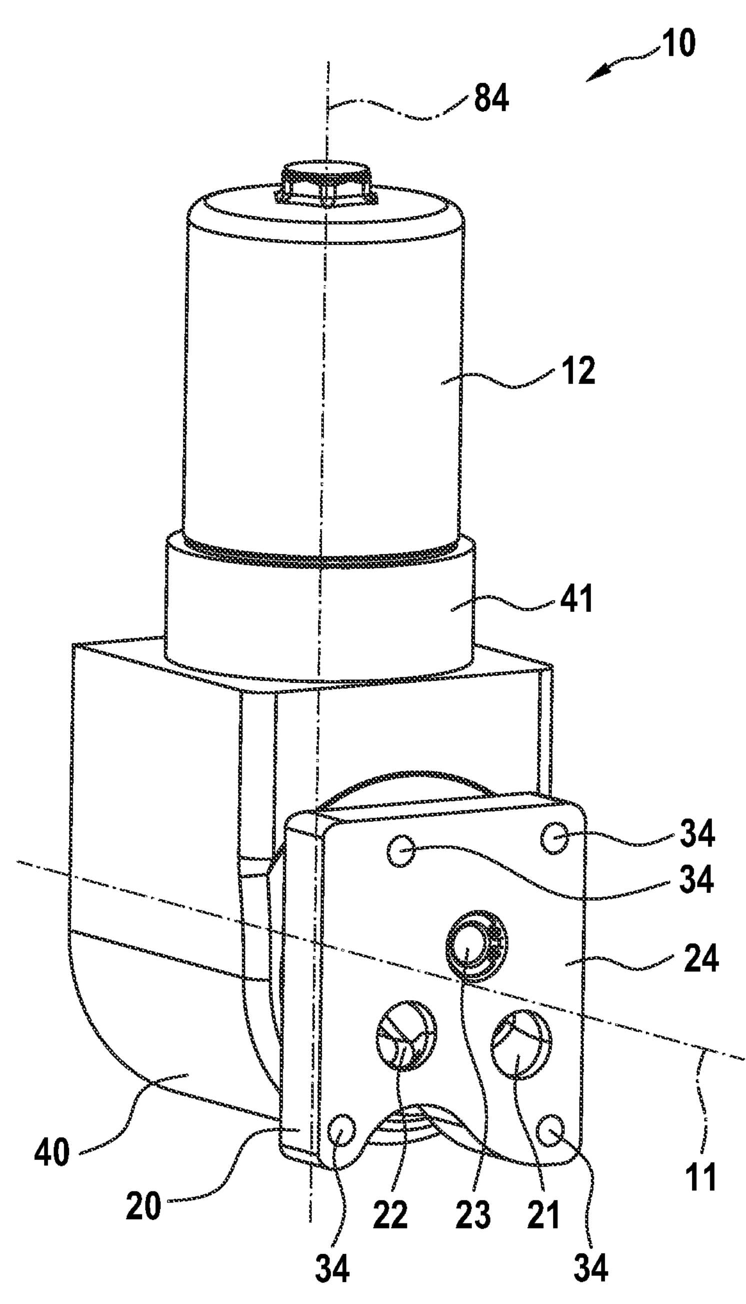
FIG. 1 a perspective view of a filter apparatus according to the disclosure.

FIG. 1 shows a perspective view of a filter apparatus 10 according to the disclosure. The filter apparatus 10 comprises a connecting part 20, which has a flat sealing face 24. The sealing face 24 is arranged on a flange-like plate, which in the present case is penetrated by four circular cylindrical fastening breakthroughs 34, by means of which the filter apparatus can be fastened to a hydraulic machine (not shown). An input connector 21, an output connector 22, and a tank connector 23 are arranged within the sealing face, each having a circular opening. The connectors 21; 22; 23 are fluid-tightly delineated from one another in the region of the sealing face 24 when the filter apparatus 10 is fastened to the hydraulic machine.

The filter apparatus 10 further comprises a separate retaining part 40, which is pivotable with respect to the pivot axis 11 relative to the connecting part 20, wherein it can be clamped in any rotational position. The filter cartridge 12 is fastened to the retaining part 40, through which the pressurized fluid present at the input connector 21 is filtered, wherein the filtered pressurized fluid is directed to the output connector 22. The pressurized fluid is preferably a liquid and most preferably a hydraulic oil.

The filter cartridge 12 is a component available on the market, which is configured so as to be largely rotationally symmetrical with respect to a center axis 84. The center axis 84 is oriented perpendicular to the pivot axis 11. The filter receptacle 41 of the retaining part 40, in which the filter cartridge 12 is fastened, is designed so as to mate with the selected filter cartridge 12, wherein this interface is standardized.

Figure 2:
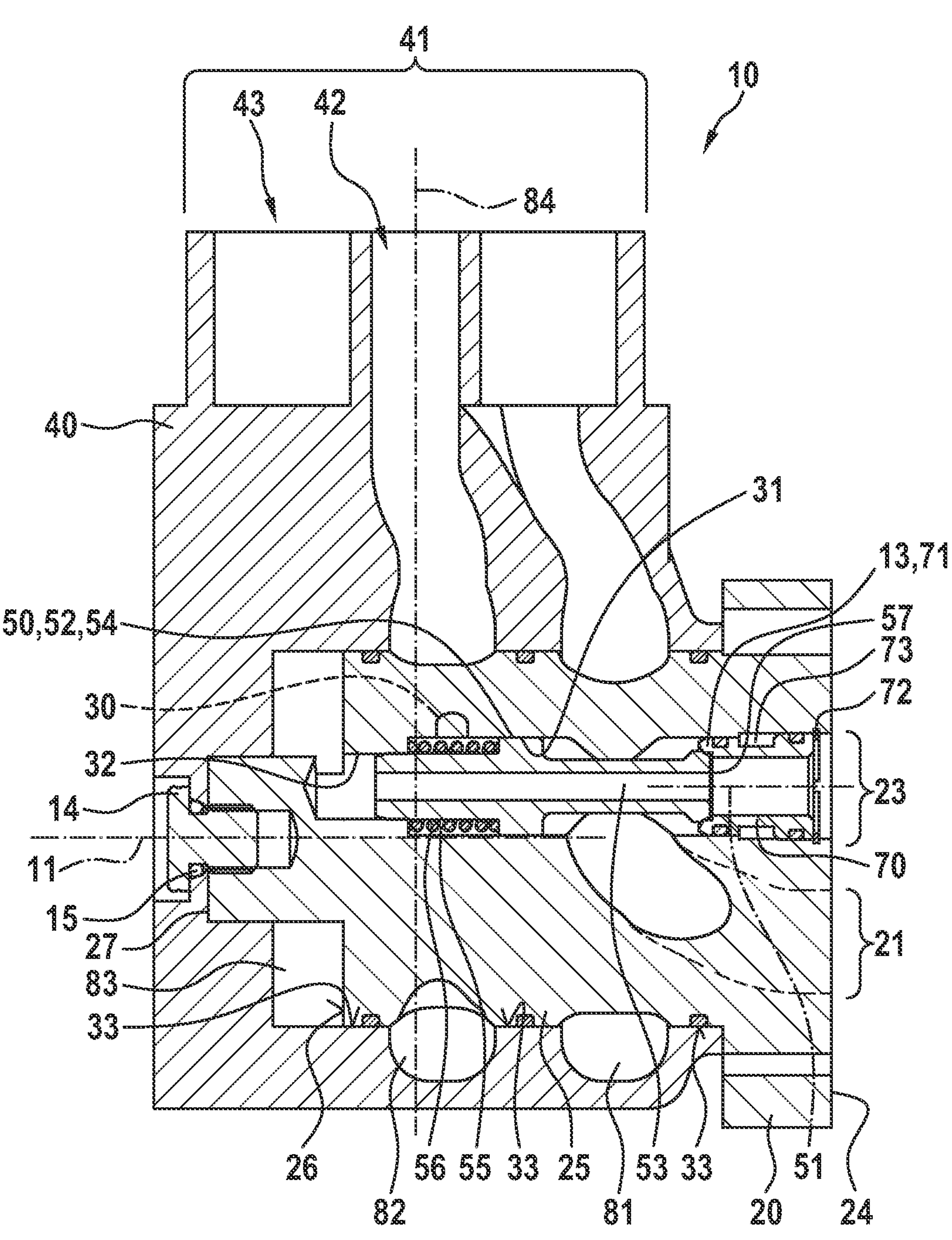
FIG. 2 a sectional view of the filter apparatus of FIG. 1 without the filter cartridge, wherein the sectional plane contains the slider axis.

FIG. 2 shows a cross-sectional view of the filter apparatus 10 of FIG. 1 without the filter cartridge, wherein the sectional plane contains the slider axis 51. The section plane is also aligned parallel to the center axis 84 of the filter cartridge. In the present case, because the center point of the tank connector 23 is arranged somewhat offset from the pivot axis 11 in the direction of view of FIG. 1, the clamping means 14 and the filter receptacle 41 are not cut at their largest diameter, for example.

The connecting part 20 is integrally formed, wherein a pivoting appendage 25 extends on the side facing away from the sealing face 24 in the direction of the pivot axis 11. In the present case, the pivoting appendage 25 has three circular cylindrical sections 33, on which it abuts the retaining part 40 in a fluid-tight manner so that the first and second pressure chambers are delineated in a fluid-tight manner. In the corresponding sealing contact, a respective sealing ring, for example an O-ring, is arranged. In order to avoid damage to the seals during the assembly of the retaining part 40 on the connecting part 20, the three circular cylindrical sections 33 have three minimally different diameters, wherein the diameter is larger the closer it is to the sealing face 24.

The first and second pressure chambers 81; 82 circumferentially revolved around the pivot axis 11 in a circular manner, wherein, in the present case, a respective annularly circumferential groove is provided in the connecting part 20 as well as in the retaining part 30, which bounds the respectively associated pressure chamber 81; 82. In the connecting part 20 there is a permanent, open passage from the input connector 21 to the first pressure chamber 81. Further, in the connecting part 20, a permanently open passage extends from the output connector 22 to the second pressure chamber 82. However, it lies completely in front of the section plane of FIG. 2, so that it is not visible in FIG. 2.

The filter receptacle 41 delineates a central and annular connecting part 42; 43 for the filter cartridge from one another in a fluid-tight manner. In the retaining part 40, a permanently open passage extends from the first pressure chamber 81 to the annular connecting part 43. Further, in the retaining part 40, a permanently open passage extends from the second pressure chamber 82 to the central connector 42. The passages discussed above are components of the first fluid flow path.

With the features described above, the filter apparatus 10 can already perform its primary function, namely filtering the pressure fluid that flows up to the input connector 21 with the filter cartridge and returning the filtered pressure fluid back to the hydraulic machine at the output connector. When putting the hydraulic machine into service, the pressurized fluid can be very cold and thus very viscous. The pressure drop at the filter cartridge would accordingly be very large. Via the cold start valve 50, the pressurized fluid can be returned to the tank in a circuit without passing through the filter cartridge. The pressurized fluid heats up so that the filtering can take place as desired after a short time. The cold start valve 50 therefore releases the second fluid flow path leading from the input connector 21 to the tank connector 23 only when the pressure difference between the input connector 21 and the output connector 22 exceeds the value set by the biasing of the spring 56.

The control slider 52 of the cold start valve 50 is received in a linearly movable manner in the direction of a slider axis 51 within the pivoting appendage 25. The slider axis 51 is arranged parallel to the pivot axis 11, wherein the two axes 51; 11 are arranged spaced apart from each other. As a result, the control slider 52 can first be arranged flush with the tank connector 23 so that the control slider 52 and the associated insert 70 can be installed in the connecting part 20 from the tank connector 23. Further, the second slider bore 32 intersects the third pressure chamber 83 so that no further bores are required for the corresponding fluid connection.

Leaks, which come in particular from the second pressure chamber 82, are discharged towards the tank connector 23 via the third pressure chamber 83. The corresponding fluid connection is permanently open. The third pressure chamber 83 also revolves annularly around the pivot axis 11. It is bounded on the pivoting appendage 25 by a planar first end face 26 of the pivoting appendage 25, which is oriented perpendicular to the pivot axis 11, wherein it revolves annularly around it. The first end face 26 is spaced apart from an associated annular surface on the retaining part 40. Radially inwardly, the third pressure chamber 83 is bounded by a circular cylindrical surface on the connecting part 20 relative to the pivot axis 11, wherein it is bounded radially outward by a circular cylindrical surface on the retaining part 40 relative to the pivot axis 11. The control slider 52 is penetrated by a longitudinal bore 53 in the direction of the slider axis 51 along its entire length, which causes the aforementioned fluid connection between the third pressure chamber 83 and the tank connector 23.

The control slider 52 is associated with a first and a second slider bore 31; 32, each of which is circularly cylindrical relative to the slider axis 51. The second slider bore 32, arranged further away from the sealing face 24, has a smaller diameter than the first slider bore 31. The control slider 52 has a collar 54 that slidably abuts the first slider bore 31. The collar 54 delineates the pressure within the first and second pressure chambers 81; 82 substantially fluidly-tightly from one another. The pressure in the first pressure chamber 81 effectively acts on a circular surface, whose outer diameter is equal to the diameter of the first slider bore 31, wherein its inner diameter is equal to the sealing diameter of the seat valve 13. The pressure in the second pressure chamber 82 is effectively applied to a circular surface whose outer diameter is equal to the diameter of the first slider bore 31, wherein its inner diameter is equal to the diameter of the second slider bore 32. The surfaces of the latter two are preferably of equal size, so that the diameter of the second slider bore 32 is equal to the sealing diameter of the seat valve 13. It is noted here that control slider 52 has a circular cylindrical section with respect to the slider axis 51, which dips into the second slider bore 32 in any position of the control slider 52, wherein the corresponding contact is fluid-tight except for unavoidable leakages. This engagement creates an annular space 55 between the control slider 52 and the first slider bore 31, in which a spring 56 is received, the biasing force of which pressurizes the collar 54 in the closing direction of the seat valve 13. In this annular space 55, the pressure of the second pressure chamber 82 prevails, which is directed thereto via at least one radial bore 30 in the connecting part 20.

The aforementioned seat valve 13 is configured as a tapered seat valve, for example. Its valve seat 71 is formed by a separate insert 70, which is received between the control slider 52 and the tank connector 23 in the connecting part 20. The insert 70 is retained by a securing ring 72 in a circular cylindrical receptacle bore that is stepped relative to the slider axis. On its outer peripheral surface, it preferably has a circularly annular leakage oil space 73, which is permanently connected to the tank connector 23 so that leakages on the inner seal of the insert are discharged in a defined manner.

The valve body of the seat valve 13 is formed by an end face of the control slider 52, wherein, for example, a sealing edge that revolves annularly about the slider axis 51 is provided there, which fluidly abuts the valve seat 71 that is circularly conical with respect to the slider axis when the seat valve 13 is closed. The diameter of the sealing edge corresponds to the sealing diameter of the seat valve 13 discussed above.

Reference will further be made to the circular second end face 27 on the pivoting appendage 25, which is arranged offset from the first end face 26 in the direction of the pivot axis 11. The retaining part 40 is clamped against the second end face 27 by means of a clamping means 14. The clamping means 14 is configured as a clamping screw, which is equipped with a sealing ring 15 in the region of its head. The sealing ring 15 is configured as an O-ring, for example, which is stressed against a circular conical recess in the retaining part 40.

Figure 3:
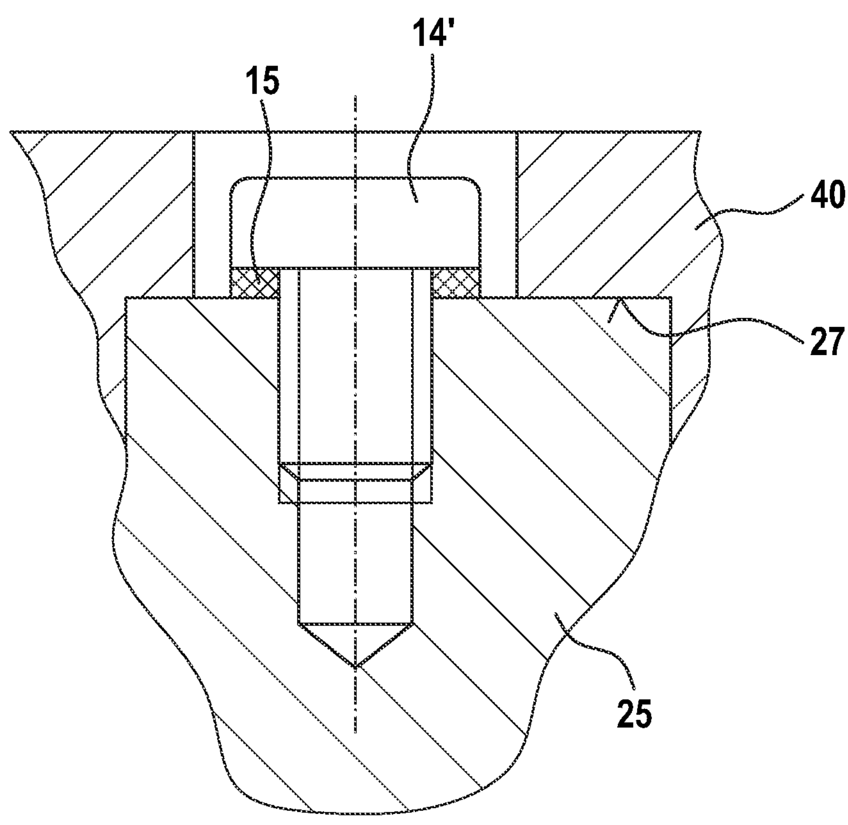
FIG. 3 a partial section of the filter apparatus with a clamping means according to a second embodiment.

FIG. 3 shows a partial section of the filter apparatus with a clamping means 14' according to a second embodiment. In the second embodiment of the clamping means 14', an inexpensive clamping screw has been used, for example a cylinder head screw or a hexagon screw. If a so-called USIT ring is used as the sealing ring, a perfect seal can still be achieved without the need for the conical depression of the first embodiment.

REFERENCE NUMERALS

10 Filter apparatus
11 Pivot axis
12 Filter cartridge
13 Seat valve
14 Clamping means
14' Clamping means (second embodiment)
15 Sealing ring
20 Connecting part
21 Input connector
22 Output connector
23 Tank connector
24 Sealing face
25 Pivoting appendage
26 First end face
27 Second end face
30 Radial bore
31 First slider bore
32 Second slider bore
33 Circular cylindrical abutment face
34 Fastening breakthrough
40 Retaining part
41 Filter receptacle
42 Central connector
43 Annular connector
50 Cold start valve
51 Slider axis
52 Control slider
53 Longitudinal bore
54 Collar
55 Annular space
56 Spring
57 End face of control slider
70 Insert
71 Valve seat
72 Securing ring
73 Leakage oil space
81 First pressure chamber
82 Second pressure chamber
83 Third pressure chamber
84 Central axis of the filter cartridge

What is claimed is:

1. A filter apparatus for use with a hydraulic machine, the filter apparatus comprising:

a connecting part comprising (i) a sealing face configured for sealing abutment on the hydraulic machine, and (ii) a pivoting appendage extending along a pivot axis on a side of the connecting part facing away from the sealing face;

a filter cartridge;

an input connector arranged within the sealing face;

an output connector arranged within the sealing face;

a first fluid flow path leading from the input connector to the output connector; and a separate retaining part on which the filter cartridge is fixedly received, the retaining part fluid-tightly adapted to the pivoting appendage such that (i) a pivoting position of the pivoting appendage with respect to the pivot axis is continuously adjustable relative to the connecting part, and (ii) between the retaining part and the pivoting appendage, a first pressure chamber and a second pressure chamber are arranged, wherein the first fluid flow path leads from the input connector through the connecting part by way of the first pressure chamber through the retaining part to the filter cartridge, further through the retaining part to the second pressure chamber, and further to the output connector by way of the connecting part.

2. The filter apparatus according to claim 1, wherein:

the sealing face is planar, and the pivot axis is aligned perpendicular to the sealing face.

3. The filter apparatus according to claim 1, wherein the first pressure chamber and/or the second pressure chamber revolve around the pivot axis as a closed ring.

4. The filter apparatus according to claim 1, further comprising:

a tank connector arranged within the sealing face;

a cold start valve arranged within the pivoting appendage; and a second fluid flow path leading from the input connector by way of the cold start valve to the tank connector, wherein the cold start valve is configured such that the second fluid flow path is opened when a difference between a pressure at the input connector and a pressure at the output connector exceeds a specified value.

5. The filter apparatus according to claim 4, wherein:

the cold start valve comprises a control slider received within the pivoting appendage, the control slider is linearly movable in a direction of a slider axis, and the slider axis is oriented parallel to the pivot axis.

6. The filter apparatus according to claim 5, further comprising:

a third pressure chamber (i) arranged between the retaining part and the pivoting appendage, (ii) delimited in sections by a first end face of the pivoting appendage facing in a direction of the pivot axis, and (iii) permanently fluidly connected to the tank connector.

7. The filter apparatus according to claim 6, further comprising:

a clamp, wherein the pivoting appendage has a second end face facing in the direction of the pivot axis and being arranged offset from the first end face in the direction of the pivot axis, wherein the second end face directly abuts the retaining part, and wherein the clamp is configured to clamp the retaining part against the second end face.

8. The filter apparatus according to claim 6, wherein the control slider is arranged flush with the tank connector in the direction of the slider axis.

9. The filter apparatus according to claim 8, wherein the control slider is penetrated by a longitudinal bore in the direction of the slider axis, such that the third pressure chamber is permanently fluidly connected to the tank connector by way of the longitudinal bore.

10. The filter apparatus according to claim 5, further comprising:

a separate insert arranged between the control slider and the tank connector and configured to form a valve seat, wherein the valve seat and an end face of the control slider form a seat valve in which the end face of the control slider closes the valve seat, wherein the first pressure chamber is connected to the tank connector by way of the seat valve in order to selectively open or close the second fluid flow path, and wherein the separate insert is fixedly retained in the connecting part at least in the direction of the pivot axis and radially to the slider axis.

11. The filter apparatus according to claim 5, wherein the control slider has a collar that fluid-tightly abuts a first slider bore in the connecting part, such that (i) a corresponding sealing engagement seals a pressure in the first pressure chamber and a pressure in the second pressure chamber from one another, and (ii) the control slider is impinged by a difference between the pressure in the first pressure chamber and the pressure in the second pressure chamber in the direction of the slider axis.

12. The filter apparatus according to claim 11, wherein:

at an end facing away from the sealing face, the control slider is dipped into a fluid-tightly adapted second slider bore for each position of the control slider, a diameter of the second slider bore is less than a diameter of the first slider bore, such that an annular space results in a region of the end facing away from the sealing face of the control slider, and the annular space is permanently fluidly connected to the second pressure chamber.

13. The filter apparatus according to claim 12, further comprising:

a spring received in the annular space and configured to impinge the collar of the control slider in a closing direction of a seat valve formed by the valve seat and an end face of the control slider.

* * * * *